US007645380B2

(12) United States Patent
Kerfoot

(10) Patent No.: US 7,645,380 B2
(45) Date of Patent: Jan. 12, 2010

(54) MICROPOROUS DIFFUSION APPARATUS

(75) Inventor: William B. Kerfoot, Falmouth, MA (US)

(73) Assignee: ThinkVillage-Kerfoot, LLC, Boulder, CO (US)

( * ) Notice: Subject to any disclaimer, the term of this patent is extended or adjusted under 35 U.S.C. 154(b) by 0 days.

(21) Appl. No.: 12/259,051

(22) Filed: Oct. 27, 2008

(65) Prior Publication Data

US 2009/0050549 A1 Feb. 26, 2009

Related U.S. Application Data

(63) Continuation of application No. 10/997,452, filed on Nov. 24, 2004, now Pat. No. 7,537,706, which is a continuation of application No. 09/943,111, filed on Aug. 30, 2001, now Pat. No. 6,872,318, which is a continuation of application No. 09/606,952, filed on Jun. 29, 2000, now Pat. No. 6,284,143, which is a continuation of application No. 09/220,401, filed on Dec. 24, 1998, now Pat. No. 6,083,407, which is a continuation of application No. 08/756,273, filed on Nov. 25, 1996, now Pat. No. 5,855,775, which is a continuation-in-part of application No. 08/638,017, filed on Apr. 25, 1996, now abandoned, which is a continuation-in-part of application No. 29/038,499, filed on May 5, 1995, now abandoned.

(51) Int. Cl.
C02F 1/78 (2006.01)
B09B 3/00 (2006.01)

(52) U.S. Cl. .............................. 210/170.07; 210/198.1; 405/128.75

(58) Field of Classification Search ............ 210/170.01, 210/170.07, 198.1, 206; 405/128.1, 128.15, 405/128.5, 128.75
See application file for complete search history.

(56) References Cited

U.S. PATENT DOCUMENTS

| 1,920,719 | A | 8/1933 | Stich |
| 2,517,525 | A | 8/1950 | Cummings |
| 3,276,994 | A | 10/1966 | Andrews |

(Continued)

FOREIGN PATENT DOCUMENTS

| DE | 3805200 | 9/1998 |
| EP | 0402158 | 12/1990 |
| EP | 0546335 | 6/1993 |

(Continued)

OTHER PUBLICATIONS

*ThinkVillage-Kerfoot LLC v. Groundwater & Environmental Services, Inc.*, Complaint for Patent Infringement, US District Court for the District of Massachusetts, Oct. 7, 2008, 5 pages.
*ThinkVillage-Kerfoot LLC v. Groundwater & Environmental Services, Inc.*, Answer and Counterclaims, Civil Action No. 1:08-cv-11711-GAO, Dec. 5, 2008, 7 pages.
*ThinkVillage-Kerfoot LLC v. Groundwater & Environmental Services, Inc.*, Amended Answer and Counterclaims, Civil Action No. 1:08-cv-11711-GAO, Dec. 15, 2008, 7 pages.

(Continued)

*Primary Examiner*—Fred Prince
(74) *Attorney, Agent, or Firm*—Lathrop & Gage LLP

(57) ABSTRACT

Apparatuses for removal of volatile organic compounds in a soil formation include a microporous diffuser for injecting air and gaseous ozone as bubbles into water in the soil formation. The gaseous ozone is present at concentrations to effect removal of volatile organic compounds by the gaseous ozone reacting with the volatile organic compound(s). Injection of air and gaseous ozone is controlled by a timer to allow separation of bubbles by size. In various embodiments, a plurality of microporous diffusers may be controlled by a single timer or each of the plurality of microporous diffusers may be controlled by one of a plurality of timers.

20 Claims, 12 Drawing Sheets

U.S. PATENT DOCUMENTS

| | | |
|---|---|---|
| 3,441,216 A | 4/1969 | Good |
| 3,708,206 A | 1/1973 | Hard et al. |
| 3,814,394 A | 6/1974 | Murray |
| 3,823,776 A | 7/1974 | Holmes |
| 3,997,447 A | 12/1976 | Breton et al. |
| 4,007,118 A | 2/1977 | Ciambrone |
| 4,021,347 A | 5/1977 | Teller et al. |
| 4,048,072 A | 9/1977 | McCullough |
| 4,049,552 A | 9/1977 | Arff |
| 4,064,163 A | 12/1977 | Drach et al. |
| 4,118,447 A | 10/1978 | Richter |
| 4,178,239 A | 12/1979 | Lowther |
| 4,203,837 A | 5/1980 | Hoge et al. |
| 4,268,283 A | 5/1981 | Roberts |
| 4,298,467 A | 11/1981 | Gartner et al. |
| 4,310,057 A | 1/1982 | Brame |
| 4,351,810 A | 9/1982 | Martinez et al. |
| 4,360,234 A | 11/1982 | Hsueh et al. |
| 4,614,596 A | 9/1986 | Wyness |
| 4,622,139 A | 11/1986 | Brown |
| 4,639,314 A | 1/1987 | Tyer |
| 4,684,479 A | 8/1987 | D'Arrigo |
| 4,695,447 A | 9/1987 | Schultz |
| 4,696,739 A | 9/1987 | Pedneault |
| 4,730,672 A | 3/1988 | Payne |
| 4,804,050 A | 2/1989 | Kerfoot |
| 4,832,122 A | 5/1989 | Corey et al. |
| 4,837,153 A | 6/1989 | Laurenson, Jr. |
| 4,838,434 A | 6/1989 | Miller et al. |
| 4,844,795 A | 7/1989 | Halwani |
| 4,883,589 A | 11/1989 | Konon |
| 4,941,957 A | 7/1990 | Zeff et al. |
| 4,943,305 A | 7/1990 | Bernhardt |
| 4,960,706 A | 10/1990 | Bliem et al. |
| 4,966,717 A | 10/1990 | Kern |
| 4,971,731 A | 11/1990 | Zipperian |
| 5,078,921 A | 1/1992 | Zipperian |
| 5,080,805 A | 1/1992 | Houser |
| 5,116,163 A | 5/1992 | Bernhardt |
| 5,120,442 A | 6/1992 | Kull et al. |
| 5,122,165 A | 6/1992 | Wang et al. |
| 5,126,111 A | 6/1992 | Al-Ekabi et al. |
| 5,133,906 A | 7/1992 | Louis |
| 5,160,655 A | 11/1992 | Donker et al. |
| 5,167,806 A | 12/1992 | Wang et al. |
| 5,178,491 A * | 1/1993 | Graves et al. ............ 405/128.3 |
| 5,178,755 A | 1/1993 | LaCrosse |
| 5,180,503 A | 1/1993 | Gorelick et al. |
| 5,205,927 A * | 4/1993 | Wickramanayake ... 210/170.07 |
| 5,215,680 A | 6/1993 | D'Arrigo |
| 5,221,159 A | 6/1993 | Billings et al. |
| 5,227,184 A | 7/1993 | Hurst |
| 5,238,437 A | 8/1993 | Vowles et al. |
| 5,246,309 A * | 9/1993 | Hobby ................... 405/128.3 |
| 5,248,395 A | 9/1993 | Rastelli et al. |
| 5,254,253 A | 10/1993 | Behmann |
| 5,259,962 A | 11/1993 | Later |
| 5,269,943 A | 12/1993 | Wickramanayake |
| 5,277,518 A | 1/1994 | Billings et al. |
| 5,302,286 A | 4/1994 | Semprini et al. |
| 5,332,333 A | 7/1994 | Bentley |
| 5,362,400 A | 11/1994 | Martinell |
| 5,364,537 A | 11/1994 | Paillard |
| 5,375,539 A * | 12/1994 | Rippberger ................ 110/238 |
| 5,389,267 A | 2/1995 | Gorelick et al. |
| 5,398,757 A | 3/1995 | Corte et al. |
| RE34,890 E | 4/1995 | Sacre |
| 5,402,848 A | 4/1995 | Kelly |
| 5,403,476 A | 4/1995 | Bernhardt |
| 5,406,950 A | 4/1995 | Brandenburger et al. |
| 5,425,598 A | 6/1995 | Pennington |
| 5,427,693 A | 6/1995 | Mausgrover et al. |
| 5,430,228 A | 7/1995 | Ciambrone et al. |
| 5,431,286 A | 7/1995 | Xu et al. |
| 5,451,320 A | 9/1995 | Wang et al. |
| 5,464,309 A | 11/1995 | Mancini et al. |
| 5,472,294 A | 12/1995 | Billings et al. |
| 5,480,549 A | 1/1996 | Looney et al. |
| 5,520,483 A | 5/1996 | Vigneri |
| 5,525,008 A | 6/1996 | Wilson |
| 5,560,737 A | 10/1996 | Schuring et al. |
| 5,588,490 A | 12/1996 | Suthersan et al. |
| 5,609,798 A | 3/1997 | Liu et al. |
| 5,615,974 A | 4/1997 | Land et al. |
| 5,620,593 A | 4/1997 | Stagner |
| 5,622,450 A | 4/1997 | Grant, Jr. |
| 5,624,635 A | 4/1997 | Pryor |
| 5,663,475 A | 9/1997 | Elgal |
| 5,664,628 A | 9/1997 | Koehler et al. |
| 5,667,733 A | 9/1997 | Waldron, Sr. |
| 5,676,823 A | 10/1997 | McKay et al. |
| 5,698,092 A | 12/1997 | Chen |
| 5,741,427 A | 4/1998 | Watts et al. |
| 5,827,485 A | 10/1998 | Libal et al. |
| 5,833,388 A | 11/1998 | Edwards et al. |
| 5,851,407 A | 12/1998 | Bowman et al. |
| 5,855,775 A | 1/1999 | Kerfoot |
| 5,860,598 A | 1/1999 | Cruz |
| 5,879,108 A | 3/1999 | Haddad |
| 5,925,257 A | 7/1999 | Albelda et al. |
| 5,954,452 A | 9/1999 | Goldstein |
| 5,967,230 A | 10/1999 | Cooper et al. |
| 5,975,800 A | 11/1999 | Edwards et al. |
| 6,007,274 A | 12/1999 | Suthersan |
| 6,017,449 A | 1/2000 | Eriksson et al. |
| 6,083,403 A | 7/2000 | Tang et al. |
| 6,083,407 A | 7/2000 | Kerfoot |
| 6,086,769 A | 7/2000 | Kilambi et al. |
| 6,136,186 A | 10/2000 | Gonzalez-Martin et al. |
| 6,139,755 A | 10/2000 | Marte et al. |
| 6,210,955 B1 | 4/2001 | Hayes |
| 6,214,240 B1 | 4/2001 | Yasunaga et al. |
| 6,217,767 B1 | 4/2001 | Clark |
| 6,254,310 B1 | 7/2001 | Suthersan |
| 6,283,674 B1 | 9/2001 | Suthersan |
| 6,284,143 B1 | 9/2001 | Kerfoot |
| 6,306,296 B1 | 10/2001 | Kerfoot |
| 6,312,605 B1 | 11/2001 | Kerfoot |
| 6,352,387 B1 | 3/2002 | Briggs et al. |
| 6,357,670 B2 | 3/2002 | Ganan-Calvo |
| 6,364,162 B1 | 4/2002 | Johnson |
| 6,391,259 B1 | 5/2002 | Malkin et al. |
| 6,403,034 B1 | 6/2002 | Nelson et al. |
| 6,428,694 B1 | 8/2002 | Brown |
| 6,436,285 B1 | 8/2002 | Kerfoot |
| 6,447,676 B1 | 9/2002 | Kerfoot |
| 6,488,850 B2 | 12/2002 | Perriello |
| 6,533,499 B2 | 3/2003 | Breeding |
| 6,582,611 B1 | 6/2003 | Kerfoot |
| 6,596,161 B2 | 7/2003 | Kerfoot |
| 6,596,177 B2 | 7/2003 | Sherman |
| 6,623,211 B2 | 9/2003 | Kukor et al. |
| 6,645,450 B2 | 11/2003 | Stoltz et al. |
| 6,733,207 B2 | 5/2004 | Liebert, Jr. et al. |
| 6,736,379 B1 | 5/2004 | Wegner et al. |
| 6,745,815 B1 | 6/2004 | Senyard |
| 6,773,609 B1 | 8/2004 | Hashizume |
| 6,780,329 B2 | 8/2004 | Kerfoot |
| 6,787,038 B2 | 9/2004 | Brusseau et al. |
| 6,805,798 B2 | 10/2004 | Kerfoot |
| 6,818,136 B1 | 11/2004 | Marek |
| 6,827,861 B2 | 12/2004 | Kerfoot |
| 6,866,781 B2 | 3/2005 | Schindler |
| 6,872,318 B2 | 3/2005 | Kerfoot |

| | | | |
|---|---|---|---|
| 6,921,477 | B2 | 7/2005 | Wilhelm |
| 6,984,329 | B2 | 1/2006 | Kerfoot |
| 7,022,241 | B2 | 4/2006 | Kerfoot |
| 7,033,492 | B2 | 4/2006 | Kerfoot |
| 7,131,638 | B2 | 11/2006 | Kerfoot |
| 7,156,984 | B2 | 1/2007 | Kerfoot |
| 7,208,090 | B2 | 4/2007 | Applegate et al. |
| 7,264,747 | B2 | 9/2007 | Kerfoot |
| 7,300,039 | B2 | 11/2007 | Kerfoot |
| 7,442,313 | B2 | 10/2008 | Kerfoot |
| 7,537,706 | B2 | 5/2009 | Kerfoot |
| 2002/0029493 | A1 | 3/2002 | Baek |
| 2002/0109247 | A1 | 8/2002 | Jager et al. |
| 2003/0029792 | A1 | 2/2003 | Kerfoot |
| 2003/0222359 | A1 | 12/2003 | Jager |
| 2004/0045911 | A1 | 3/2004 | Kerfoot |
| 2005/0067356 | A1 | 3/2005 | Bowman et al. |
| 2006/0243668 | A1 | 11/2006 | Miller et al. |

FOREIGN PATENT DOCUMENTS

| | | | |
|---|---|---|---|
| GB | 2005655 | A | 4/1979 |
| GB | 2185901 | A | 8/1987 |
| JP | 1-304838 | | 12/1989 |
| JP | 3267196 | | 11/1991 |
| JP | 4-171036 | | 6/1992 |
| JP | 6-023378 | | 1/1994 |
| JP | 40931314 | | 12/1997 |
| WO | WO 98/21152 | | 5/1998 |
| WO | WO 99/54258 | | 10/1999 |
| WO | WO 2005063367 | | 7/2005 |

OTHER PUBLICATIONS

*ThinkVillage-Kerfoot LLC* v. *Groundwater & Environmental Services, Inc.*, Plaintiff's Response to Defendant Groundwater & Environmental Services, Inc.'s Amended Counterclaims, Civil Action No. 1:08-cv-11711-GAO, Dec. 30, 2008, 5 pages.
Civil Action No. 1:08-cv-11711-GAO, Groundwater & Environmental Services, Inc.'s Objections And Responses To Plaintiff's Requests For Production Of Documents And Things, Mar. 4, 2009, 54 pages.
Civil Action No. 1:08-cv-11711-GAO, Groundwater & Environmental Services, Inc.'s Objections And Answers To Plaintiff's Interrogatories, Mar. 4, 2009, 10 pages.
Civil Action No. 1:08-cv-11711-GAO, ThinkVillage-Kerfoot, LLC's Responses To Defendant's Interrogatories (Nos. 1-11) Apr. 9, 2009, 12 pages.
Civil Action No. 1:08-cv-11711-GAO, ThinkVillage-Kerfoot, LLC's Objections And Responses To Defendant's First Set of Requests For Production (Nos. 1-98) Apr. 9, 2009, 37 pages.
Civil Action No. 1:08-cv-11711-GAO, ThinkVillage-Kerfoot, LLC's Supplemental Responses To Defendant's Interrogatories (Nos. 7 and 8) Jun. 2, 2009, 9 pages.
PCT/US04/43634 International Search Report mailed May 18, 2005, 1 page.
PCT/US04/43634 International Preliminary Report on Patentability, Jun. 26, 2006, 5 pages.
Makarov, A. M. & Sorokin, S.S., "Heat Exchange of a Bubble Coated with a Liquid Film on the Rear Surface," Chemical and Petroleum Engineering, vol. 30, No. 2, 1994, pp. 78-81.
Abstract JP 6-238260, Aug. 30, 1994, Karuto.
U.S. Appl. No. 09/470,167 (U.S. 6,436,285) Selected pages from File History dated Aug. 23, 2002 through Mar. 29, 2001, 38 pages.
U.S. Appl. No. 09/860,659, Selected pages from Image File Wrapper dated Aug. 13, 2002 through Aug. 23, 2004, 68 pages.
U.S. Appl. No. 09/943,111, Selected pages from Image File Wrapper dated Jan. 30, 2003 through Feb. 19, 2005, 47 pages.
U.S. Appl. No. 09/993,152, Selected pages from Image File Wrapper dated Sep. 4, 2007 through Mar. 10, 2009, 59 pages.
U.S. Appl. No. 10/223,166 (U.S. 6,596,161) Selected pages from File History dated Nov. 6, 2002 through Jul. 22, 2003, 22 pages.
U.S. Appl. No. 10/354,584 Selected pages from Image File Wrapper dated Jul. 30, 2003 through Jul. 6, 2004, 32 pages.
U.S. Appl. No. 10/365,027, Selected pages from Image File Wrapper dated Apr. 16, 2004 through May 2, 2005, 53 pages.
U.S. Appl. No. 10/602,256, Selected pages from Image File Wrapper dated Jan. 11, 2005 through Dec. 12, 2002, 33 pages.
U.S. Appl. No. 10/745,939, Selected Pages from Image File Wrapper dated Jun. 22, 2006 through Jul. 22, 2008, 110 pages.
U.S. Appl. No. 10/895,015, Selected pages from Image File Wrapper dated Jul. 14, 2006 through Feb. 9, 2009, 102 pages.
U.S. Appl. No. 10/910,441 Selected pages from Image File Wrapper dated Dec. 1, 2004 through Sep. 12, 2005, 36 pages.
U.S. Appl. No. 10/916,863 Selected pages from Image File Wrapper dated Dec. 28, 2006 through Oct. 8, 2008, 39 pages.
U.S. Appl. No. 10/963,353 Selected pages from Image File Wrapper dated Aug. 23, 2005 through Dec. 13, 2006, 46 pages.
U.S. Appl. No. 10/994,960 Selected pages from Image File Wrapper dated Mar. 11, 2005 through Dec. 2, 2005, 36 pages.
U.S. Appl. No. 10/997,452 Selected pages from Image File Wrapper dated Jun. 27, 2007 through Mar. 23, 2009, 144 pages.
U.S. Appl. No. 11/145,871 selected pages from Image File Wrapper, Jun. 12, 2007 through Jun. 27, 2008, 82 pages.
U.S. Appl. No. 11/145,871, Response to Office Action filed Dec. 16, 2008, 12 pages.
U.S. Appl. No. 11/145,871, Office Action mailed Mar. 18, 2009, 16 pages.
U.S. Appl. No. 11/145,871 Response to Office Action filed Jun. 18, 2009.
U.S. Appl. No. 11/146,722 Selected pages from Image File Wrapper dated Jun. 7, 2005 through Sep. 18, 2006, 70 pages.
U.S. Appl. No. 11/272,446 Selected pages from File History dated Jan. 22, 2008 through May 1, 2009, 60 pages.
U.S. Appl. No. 11/328,475 Selected pages from Image File Wrapper dated Jun. 30, 2006 through Aug. 15, 2007, 45 pages.
U.S. Appl. No. 11/409,892 Selected pages from Image File Wrapper dated Jul. 31, 2006 through May 21, 2009, 94 pages.
U.S. Appl. No. 11/485,080 Selected pages from Image File Wrapper dated May 11, 2007 through Jan. 9, 2009, 83 pages.
U.S. Appl. No. 11/485,080, Response to Office Action filed May 8, 2009, 4 pages.
U.S. Appl. No. 11/485,223 Office Action mailed Jun. 15, 2009, 8 pages.
U.S. Appl. No. 11/485,223 Selected pages from Image File Wrapper dated Feb. 26, 2008 through Mar. 11, 2009, 36 pages.
U.S. Appl. No. 11/594,019 Selected pages from Image File Wrapper dated Apr. 25, 2007 through Oct. 29, 2008, 45 pages.
U.S. Appl. No. 11/849,413 Selected pages from Image File Wrapper dated Sep. 4, 2007 through Mar. 10, 2009, 94 pages.
U.S. Appl. No. 12/177,467 Selected pages from Image File Wrapper dated Dec. 29, 2008 through Jun. 12, 2009, 20 pages.
U.S. Appl. No. 12/254,359, Notice of Allowance dated Apr. 1, 2009, 7 pages.
U.S. Appl. No. 12/272,462, Restriction Requirement mailed Jun. 2, 2009, 5 pages.
Canadian Patent Application No. 2,351,257, Office Action dated May 1, 2009, 4 pages.
PCT/US05/25478, International Search Report & Written Opinion, mailed Feb. 15, 2006, 4 pages.
PCT/US05/25478, International Preliminary Report on Patentability, Jan. 23, 2007, 4 pages.
U.S. Appl. No. 12/254,359, Notice of Allowance dated Jul. 6, 2009, 4 pages.
U.S. Appl. No. 12/272,462, Response to Restriction Requirement filed Jul. 2, 2009, 12 pages.
U.S. Appl. No. 11/485,080, Notice of Allowance dated Jul. 9, 2009, 4 pages.
Civil Action No. 1:08-cv-11711-GAO, Groundwater & Environmental Services, Inc.'s Supplemental Response to Plaintiff's Interrogatory Three, Jun. 25, 2009, 36 pages.
Civil Action No. 1:08-cv-11711-GAO, Groundwater & Environmental Services, Inc.'s Supplemental Response to Plaintiff's Interrogatories Three and Four, Jul. 6, 2009, 164 pages.
U.S. Appl. No. 12/177,467 Notice of Allowance dated Sep. 2, 2009, 8 pages.

U.S. Appl. No. 11/485,223 Notice of Allowance dated Sep. 2, 2009, 7 pages.
U.S. Appl. No. 11/145,871, Notice of Allowance dated Sep. 9, 2009, 7 pages.
U.S. Appl. No. 12/272,462 Notice of Allowance dated Sep. 21, 2009, 8 pages.

U.S. Appl. No. 11/409,892, Notice of Allowance dated Oct. 1, 2009, 5 pages.
Canadian Application No. 2,441,259 Office Action dated Oct. 14, 2009, 7 pages.

* cited by examiner

71: AC TO DC POWER CONVERTER (OR TRICKLE CHARGED LEAD ACID BATTERY)

72: OZONE GENERATOR

73: WELL GAS RELAYS (3 WELLS SHOWN)

74: COMPRESSOR

75: MASTER RELAY

76: MAIN FUSE

77: PROGRAMMABLE TIME-CONTROLLER

78: POWER STRIP

79: GAS REGULATOR AND PRESSURE GAGE

80: SOLENOID MANIFOLD (NUMBER DEPENDS ON SERIES AND NUMBER WELL)

81: GROUND FAULT INTERRUPTOR

82: COOLING FAN

MICROPOROUS DIFFUSION APPARATUS

CROSS-REFERENCE TO RELATED APPLICATIONS

This application is a continuation of U.S. patent application Ser. No. 10/997,452, filed Nov. 24, 2004,now U.S. Pat. No. 7,537,706, which is a continuation of U.S. patent application Ser. No. 09/943,111, filed Aug. 30, 2001, now U.S. Pat. No. 6,872,318, which is a continuation of U.S. patent application Ser. No. 09/606,952, filed Jun. 29, 2000, now U.S. Pat. No. 6,284,143, which is a continuation of U.S. patent application Ser. No. 09/220,401, filed Dec. 24, 1998, now U.S. Pat. No. 6,083,407, which is a continuation of U.S. patent application Ser. No. 08/756,273, filed Nov. 25, 1996, now U.S. Pat. No. 5,855,775, which is a-continuation-in-part of U.S. patent application Ser. No. 08/638,017, filed Apr. 25, 1996, now abandoned, which is a continuation-in-part of U.S. patent application Ser. No. 29/038,499, filed May 5, 1995, now abandoned. Each of these applications is incorporated by reference in its entirety.

BACKGROUND

1. Field of Invention (Technical Field)

The present disclosure relates to apparatuses for remediation of dissolved chlorinated hydrocarbons in aquifer regions by injecting micro-fine bubbles effective for active in situ groundwater remediation for removal of dissolved chlorinated hydrocarbon solvents and dissolved hydrocarbon petroleum products. Remediation of saturated soils may also be obtained by employment of the present apparatuses.

2. Background Prior Art

There is a well recognized need to cleanup subsurface leachate plumes in aquifer regions and contaminated sites including, in particular, dry-cleaning establishments and U.S. Military Air bases. Applicant is aware of prior art devices that have used injection of air to facilitate biodegradation of plumes.

However, an apparatus using micro-fine bubbles including a multi-gas oxidizing agent for the controlled remediation of a site containing poorly biodegradable organics, particularly dissolved chlorinated solvents, has not been shown.

In fact the Federal Agency (EPA, KERR Environmental Laboratory, ADA, Oklahoma) responsible for review of clean-up procedures at Marine Corp Air Base at Yuma, Ariz. has determined that there is no prior reference which discloses the use of the present apparatuses and has ordered independent pilot tests to provide test results confirming the results previously obtained by the present apparatuses.

U.S. Pat. No. 5,221,159, to Billings, shows injection of air into aquifer regions to encourage biodegradation of leachate plumes which contain biodegradable organics together with simultaneous soil vacuum extraction.

U.S. Pat. No. 5,269,943, METHOD FOR TREATMENT OF SOILS CONTAMINATED WITH ORGANIC POLLUTANTS, to Wickramanayake, shows a method for treating soil contaminated by organic compounds where an ozone containing gas is treated with acid to increase the stability of the ozone in the soil environment and the treated ozone is applied to the contaminated soil to decompose the organic compounds.

U.S. Pat. No. 5,525,008, REMEDIATION APPARATUS AND METHOD FOR ORGANIC CONTAMINATION IN SOIL AND GROUNDWATER, to Wilson, provides a method and apparatus for in-situ treatment of soil and groundwater contaminated with organic pollutants. It involves concentration of a reactive solution required to effect treatment of the contaminated area and injecting the reactive solution into one or more injectors that are inserted into the ground. The apparatus is scaled and positioned so as to assure flow and to allow reactive solution to flow through the contaminated area thereby reacting chemically. Preferably, the reactive solution is an aqueous solution of hydrogen peroxide and metallic salts.

U.S. Pat. No. 5,178,755, UV-ENHANCED OZONE WASTEWATER TREATMENT SYSTEM, to Lacrosse, mixes wastewater with ozonated liquid within a multi-stage clarifier system and suspended solids are removed.

Notwithstanding the teachings of the prior art, there has not been shown an apparatus for remediating a site contaminated with poorly biodegradable organics, particularly dissolved chlorinated solvents, with micro-fine bubbles including an encapsulated multi-gas oxidizing agent in a controlled manner. In situ remediation is accomplished using the present instrumentalities by employing microporous diffusers which inject multi-gas bubbles containing an ozone oxidizing agent into aquifer regions to strip and rapidly decompose poorly biodegradable organics or to accelerate biodegradation of leachate plumes which contain biodegradable organics thereby overcoming at least some disadvantages of the prior art.

SUMMARY

The present disclosure relates to sparging apparatuses for injection of oxidizing gas, in the form of small bubbles, into aquifer regions to encourage in situ remediation of subsurface leachate plumes.

In particular, sparging apparatuses are disclosed for employing microporous diffusers to inject micro-fine bubbles containing encapsulated gas bubbles into aquifer regions to encourage biodegradation of leachate plumes which contain biodegradable organics, or Criegee decomposition of leachate plumes containing dissolved chlorinated hydrocarbons. The sparging apparatuses, employing microporous diffusers for injecting an encapsulated multi-gas oxidizing agent, are particularly useful in promoting extremely efficient removal of poorly biodegradable organics, such as dissolved chlorinated solvents, without the use of vacuum extraction of undesirable by-products of remediation. Furthermore, remediation occurs by employing encapsulated multi-gas oxidizing agent for destroying organic and hydrocarbon material in place with out release of contaminating vapors.

Unlike the prior art, the contaminated groundwater is injected with an air/ozone mixture wherein micro-fine air bubbles strip the solvents from the groundwater and the encapsulated ozone acts as an oxidizing agent in a gas/gas reaction to break down the contaminates into carbon dioxide, very dilute HCl and water. This system is known as the C-Sparger® system.

The present system, hereinafter C-Sparger® system, is directed to low-cost removal of dissolved chlorinated hydrocarbon solvents such as perc from contaminated soil and groundwater aquifers. The C-Sparger® system employs microporous diffusers, hereinafter Spargepoints®, for producing micro-fine bubbles containing an oxidizing agent that decomposes chlorinated hydrocarbons into harmless byproducts. The C-Sparger® system also incorporates: means for pumping a multi-gas oxidizing mixture through the Spargepoint® into groundwater in a soil formation, a bubble production chamber to generate bubbles of differing size, a timer to delay pumping until large bubbles have segregated from small bubbles by rise time, and a pump which forces the fine bubbles and liquid out into the soil formation. The pumping means intermittently agitates the water in the well in which the C-Sparger® is installed in order to effectively disturb the normal inverted cone-shaped path of the bubbles injected by the Spargepoint®. Water agitation results in random bubble dispersion to ensure improved contact between the oxidizing agent (contained in each bubble) and the pollutant. The pulsing action promotes movement of the bubbles through the porous formation. It is the in situ stripping action and maintenance of low solvent gas concentration in the bubbles which increases the efficacy and speed of remediation of a site.

The apparatus of the present disclosure is particularly useful in efficiently removing poorly biodegradable organics, particularly dissolved chlorinated solvents, without the use of vacuum extraction, wherein remediation occurs by destroying organic and hydrocarbon material in place without the release of contaminating vapors.

The multi-gas system comprises an oxidizing gas encapsulated in micro-bubbles, generated from microporous diffusers, that are matched to soil porosity. A unique bubble size range is matched to underground formation porosity and achieves dual properties of fluid like transmission and rapid extraction of selected volatile gases. Bubble size is selected so as to maintain vertical mobility. In order to accomplish a proper matching, a prior site evaluation test procedure is devised to assess the effectiveness of fluid transmission at the remediation site.

Small bubbles with a high surface to gas volume ratio are advantageous in promoting rapid extraction of volatile organic compounds, such as PCE, TCE, or DCE. Pulsed injection of small bubbles and consequent rise time is matched to the short half-life of an oxidative gas, such as ozone, to allow rapid bubble dispersion into predominantly water-saturated geological formations, and extraction and rapid decomposition of the volatile organic material. The unique apparatus of the present disclosure provides for extraction efficiency with resulting economy of operation by maximizing contaminant contact with oxidant by selective rapid extraction providing for optimum fluidity of bubbles through media which can be monitored.

The use of microporous diffuser points provides a more even distribution of air into a saturated formation than the use of pressurized wells. A sparge system installed to remediate contaminated groundwater is made more cost-effective by sparging different parts of the plume area at sequenced times. Through the proper placement of sparge locations and sequence control, any possible off-site migration of floating product is eliminated. With closely spaced Spargepoints®, water mounding is advantageous because it prevents any off-site escape of contaminant. Water mounding is used to direct floating product toward extraction sites.

The microporous diffusers and multi-gas system, referred to as Spargepoints® and C-Sparger® Systems, are designed to remove dissolved organics and solvents (chlorinated hydrocarbons) such as PCE, TCE, and DCE from contaminated groundwater. The micro-fine bubbles, produced by the Spargepoints®, contain oxygen and ozone which oxidize the chlorinated hydrocarbons to harmless gases and weak acids. High initial concentrations of these dissolved organics have been, under some specific-circumstances, reduced to levels of 1 ppb or less in periods of a few weeks. None of the models to date are designed for explosive environments.

The present systems employ a plurality of configurations consisting of Series 3500 and Series 3600 C-Sparger® models. The 3600 Series is larger and has more capacity. Specifically, the 3600 Series has a better compressor rated for continuous use, a larger ozone generator, a second Spargepoint® below the first Spargepoint® in each well, and larger diameter gas tubing. Both model series have control units that can support: one (Models 3501 & 3601), two (Models 3502 & 3602) and three separate wells (Models 3503 & 3603). The one, two, and three well models differ in the number of relays, internal piping, external ports and programming of the timer/controller.

Normal operation for C-Sparger® systems includes carrying out, in series for each well, the following functions on a timed basis: pumping air and ozone through Spargepoint® diffusers into the soil formation, pumping aerated/ozonated water into the soils and recovering treated water above. Treatment is followed by a programmable period of no external treatment and multiple wells are sequenced in turn. Agitation with pumped water disturbs the usually inverted cone-shaped path of bubbles through the soils and disperses them much more widely. This increases contact and greatly improves efficiency and speed of remediation. Vapor capture is not normally necessary.

Series 3500 and 3600 systems include a control module, one to three well assemblies depending on specific model selected, a 1.0 ft. long submersible pump power-gas line for each well and a flow meter (to check Spargepoint® flow rates). Model Series 3500 & 3600 control modules have been successfully deployed outdoors in benign and moderate environments for prolonged periods of time. The control module must be firmly mounted vertically on 4×4 posts or on a building wall near the wells.

The actual placement depths, separations, number/size of wells and overall remediation system geometry are highly variable. Differences in specific pollutant, spill, soil, groundwater and climate characteristics can greatly influence the design and geometry of the overall remediation system. Monitoring wells are usually also needed. In short, specific circumstances and conditions are often critical, however, a generic or typical overall system is shown on FIG. 1.

FIG. 13 provides the basic specification for the Series 3500 & 3600 systems. The drawing shows a single well system Series 3600 (M-3601). The Series 3500 does not have the lower Spargepoint® multiple well models (3502, 3503, 3602 & 3603), rather multiple M-3601 well units use a single control module. FIG. 2 shows a piping schematic. FIG. 3 shows an electrical schematic for a three well system (Model 3503 or 3603). Current production 3500 and 3600 Series models have an internal ground fault interrupter and surge buffers incorporated into various electrical components. FIG. 4 shows an internal layout of the control module box for a three well system (M-3503 or M-3603). FIG. 5 shows the geometry of the bottom panel on the control module identifying the external connections and ports for three well units (M-3503 & 3603). FIGS. 3 and 4 also illustrate fuses and their locations.

The Unique Use of Microfine Bubbles for Simultaneous Extraction/Decomposition.

The use of microporous Spargepoint® diffusers to create fine bubbles, which easily penetrate sandy formations to allow fluid flow, has unexpected benefits when used with multiple gas systems. Microfine bubbles accelerate the transfer rate of PCE from aqueous to gaseous state. The bubble rise transfers the PCE to the vadose zone. The ten-fold difference in surface-to-volume ratio of Spargepoint® diffuser microbubbles compared to bubbles from well screens results in a four-fold improvement in transfer rates. To block the gaseous state from reverting to a surface dissolved state in the vadose (unsaturated) zone, a microprocessor system shuttles an oxidizing gas through the vadose zone to chemically degrade the transported PCE.

Gaseous Exchange

If gaseous exchange is proportional to available surface area, with partial pressures and mixtures of volatile gases being held constant, a halving of the radius of bubbles would quadruple (i.e. 4×), the exchange rate. If, in the best case, a standard well screen creates air bubbles the size of a medium sand porosity, a microporous diffuser of 20 micron size creates a bubble one tenth (1/10) the diameter and then times the volume/surface ratio (Table 1).

TABLE 1

| Diameter (microns) | Surface Area (4 $\pi r^2$) | Volume (4/3 $r^3$) | Surface Area/Volume |
|---|---|---|---|
| 200 | 124600 | 4186666 | .03 |
| 20 | 1256 | 4186 | .3 |

Theoretically, the microporous bubbles exhibit an exchange rate of ten times the rate of a comparable bubble from a standard ten slot well screen.

Partitioning Enhancement

Soil Vapor concentrations are related to two governing systems: water phase and (non-aqueous) product phase. Henry's and Raoult's Laws (DiGiulio, 1990) are commonly used to understand equilibrium-vapor concentrations governing volatization from liquids. When soils are moist, the relative volatility is dependent upon Henry's Law. Under normal conditions (free from product) where volatile organic carbons (VOC's) are relatively low, an equilibrium of soil, water, and air is assumed to exist. The compound, tetrachloroethene (PCE), has a high exchange coefficient with a high vapor pressure (atm) and low aqueous solubility (μmole/l). By enhancing the exchange capacity at least ten fold, the rate of removal should be accelerated substantially.

Ozone is an effective oxidant used for the breakdown of organic compounds during water treatment. The major problem in effectiveness is ozone's short half-life. If ozone is mixed with sewage-containing water above-ground, the half-life is normally minutes. However, if maintained in the gaseous form, the half-life of ozone can be extended up to 15 hours. Microbubbles can be used as extracting agents by pulling chlorinated solvents out of solution into the gaseous ozone as they enter the microbubble. The small bubble's high surface-to-volume ratio increases the exchange area and accelerates the consumption of HVOC within the bubble maximizing the concentration of gas transferred into the bubble ($C_S$–C). The rate-limiting process is the area-specific diffusion (dominated by Henry's Constant), while the decomposition reaction occurs rapidly (assuming sufficient ozone).

Ozone reacts quickly and quantitatively with PCE to yield breakdown products of hydrochloric acid, carbon dioxide, and water.

Using microporous diffusers to inject ozone-containing bubbles may offset ozone's relatively short half-life. By encapsulating the ozone in fine bubbles, the bubbles would preferentially extract volatile compounds like PCE from the mixtures of soluble organic compounds they encountered. The ozone-mediated destruction of organics may then selectively target volatile organics pulled into the fine air bubbles. Even in a groundwater mixture of high organic content like diluted sewage, PCE removal could be rapid.

The unique combination of microbubble extraction and ozone-mediated degradation can be generalized to render volatile organic compounds amenable to rapid removal. The efficiency of extraction is directly proportional to Henry's Constant which serves as a diffusion coefficient for gaseous exchange (Kg).

In wastewater treatment the two-film theory of gas transfer (Metcalf and Eddy, Inc, 1991) states the rate of transfer between gas and liquid phases is generally proportional to the surface area of contact and the difference between the existing concentration and the equilibrium concentration of the gas in solution. Simply stated, if the surface-to-volume ratio of contact is increased, the rate of exchange will increase. If the gas (volatile organic compound, hereinafter "VOC") entering the bubble (or micropore space bounded by a liquid film) is consumed, the difference is maintained at a higher entry rate than if the VOC is allowed to reach saturation equilibrium. In the present case, the consumptive gas/gas reaction of PCE to by-products of HCl, $CO_2$, and $H_2O$ drives the transfer of PCE into the bubble.

The normal equation for the two-film theory of gas transfer is (Metcalf and Eddy, 1991):

$$Vm = KgA(C_S - C)$$

where:

Vm=rate of mass transfer

Kg=coefficient of diffusion for gas

A=area through which gas is diffusing $C_S$=saturation concentration of gas phase in bubble C=initial concentration of gas phase in bubble volume Table 2 gives Henry's Constants ($H_c$) for a selected number of organic compounds and the second rate constants ($R_c$) for the ozone radical rate of reaction. The fourth column presents the product of both $H_c$ and $R_c$ (RRC) as a ranking of effectiveness. In actual practice diffusion is rate-limiting, resulting in the most effective removal with PCE (tetrachloroethylene).

TABLE 2

REMOVAL RATE COEFFICIENTS FOR THE MICROBUBBLE/OZONE PROCESS - C-SPARGE

| Organic Compound | Ozone $K_2$ Second order Rate Constant[a] ($M^{-1} SEC^{-1}$) | $K_1$ Henry's Constant[b] | Rate Removal Coefficient |
|---|---|---|---|
| Benzene | 2 | 5.59 × $10^{-3}$ | .0110 |
| Toluene | 14 | 6.37 × $10^{-3}$ | .0890 |
| Chlorobenzene | 0.75 | 3.72 × $10^{-3}$ | .0028 |
| Trichloroethylene | 17 | 9.10 × $10^{-3}$ | .1540 |
| Tetrachloroethylene | 0.1 | 2.59 × $10^{-2}$ | .026 |
| Ethanol | .02 | 4.48 × $10^{-5}$ | .0000008 |

$R_c \cdot H_c$ = RRC
[a]From Hoigne and Bader, 1983
[b]From EPA 540/1-86/060, Superfund Public Health Evaluation Manual Elimination of the Need for Vapor Extraction The need for vapor control exists when vapors of VOC's partitioned from the dissolved form into the microbubbles, reach the unsaturated zone, releasing vapors. Without reaction with a decomposing gas, such as ozone, a large mass can be transmitted in a short time, creating potential health problems near residential basement areas.

The combined extraction/decomposition process has the capacity to eliminate the need for vapor capture. If the ozone-mediated decomposition rate exceeds the vertical time-of-travel, vapors will either not be produced or their concentration will be so low as to eliminate the requirement for capture.

By controlling the size of microbubbles and matching them to suitable slow rise times, the need for vapor control is eliminated.

The rise time of bubbles of different sizes was computed for water, producing the upwards gravitational velocity (Table 3). The upwards velocity provides the positive pressure to push the bubbles through the porous media, following Darcy's equation. By determining the rise rate in the field, the rise time, proportional to upwards pressure, can be calculated. The bubble size is very important. Once a bubble exceeds the pore cavity size, it is significantly retarded or trapped. Pulsing of the water phase provides a necessary boost to assure steady upwards migration and reduction of coalescence.

TABLE 3

| BUBBLE DIAMETER | UPWARD VELOCITY IN WATER | TIME (MINUTES FOR UPWARDS MIGRATION (3 METERS) (Coarse Sand and Gravel) |
| --- | --- | --- |
| 10 mm | .25 m/s | 19 min |
| 2 mm | .16 m/s | 30 min |
| .2 mm | .018 m/s | 240 min |

Elimination Rate of PCE Relative to Ozone Content

The reaction of ozone with tetrachloroethene (PCE) will produce degradation products of hydrochloric acid, carbon dioxide, and water. By adjusting the ozone concentration to match the dissolved PCE level, the PCE can be removed rapidly without excess ozone release to the air or release of PCE vapor into the unsaturated zone.

Accordingly, the object and purpose of the present disclosure is to provide microporous diffusers for removal of contaminants from soil and associated subsurface ground water aquifer, without applying a vacuum for extraction or relying on biodegradation processes.

Another object of the present disclosure is to provide multi-gas systems to be used in combination with the microporous diffusers to promote an efficient removal of poorly biodegradable organics, particularly dissolved chlorinated solvents, without vacuum extraction.

A further object of the present disclosure is to provide that remediation occurs by destroying organic and hydrocarbon material in place without release of contaminating vapors to the atmosphere.

The instrumentalities will be described for the purposes of illustration only in connection with certain embodiments; however, it is recognized that those persons skilled in the art may make various changes, modifications, improvements and additions on the illustrated embodiments all without departing from the spirit and scope of the present disclosure.

DETAILED DESCRIPTION

The present instrumentalities are directed to sparging apparatus for injection of an oxidizing gas in the form of small bubbles into aquifer regions to encourage in situ remediation of subsurface leachate plumes. In particular, microporous diffusers inject multi-gas bubbles into aquifer regions to encourage biodegradation of leachate plumes which contain biodegradable organics, or Criegee decomposition of leachate plumes containing dissolved chlorinated hydrocarbons.

Referring to FIGS. 1 through 6, there is shown a C-Sparger® System (10) consisting of multiple microporous diffusers (26) in combination with an encapsulated multi-gas system, the system (10) consists of a master unit (12) and one or more in-well sparging units (14). Each master unit (12) can operate up to a total of three wells simultaneously, and treat an area up to 50 feet wide and 100 feet long. Actual performance depends upon site conditions. Vapor capture is not normally necessary.

Figure 1:
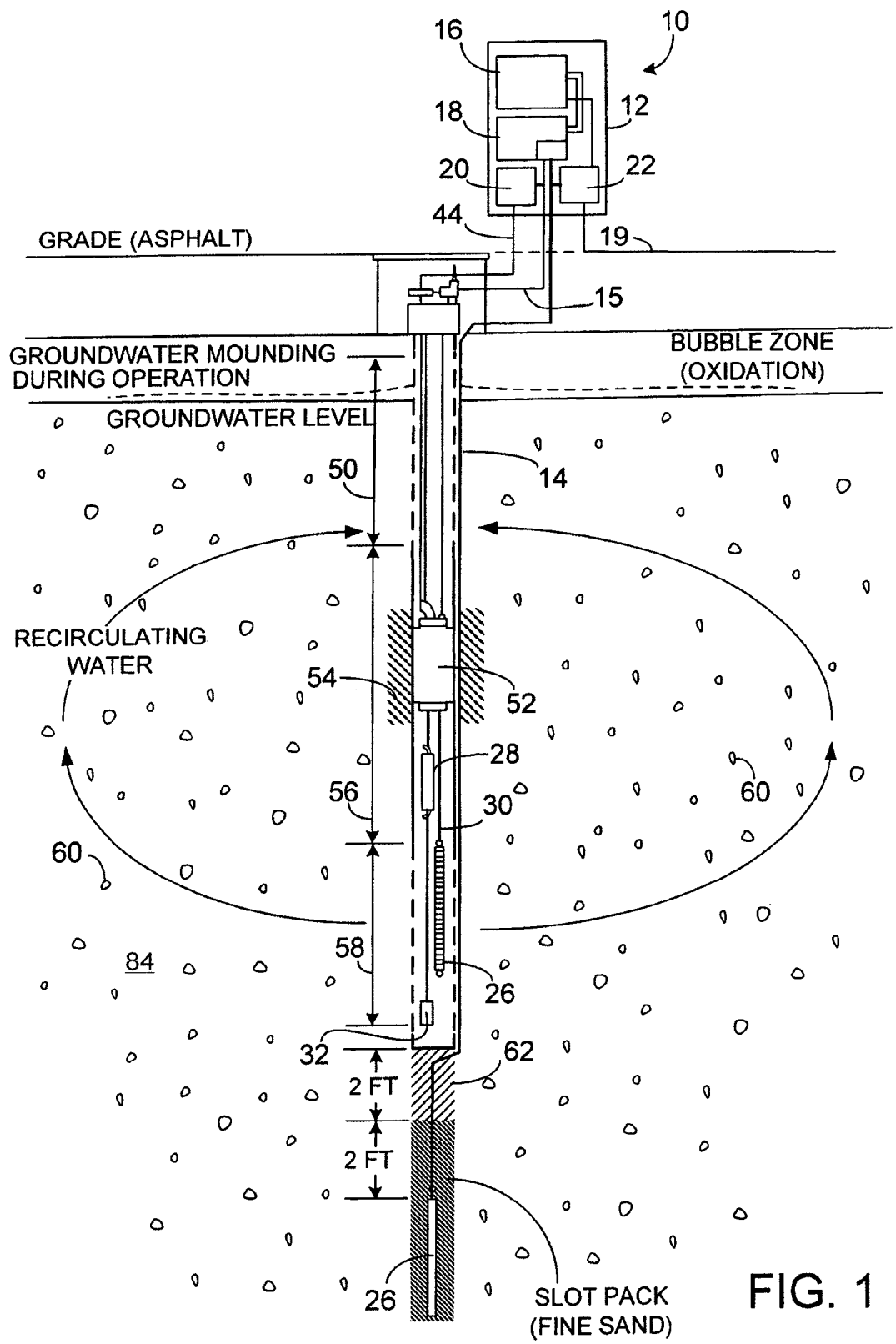
FIG. 1 is a cross sectional schematic illustration of a soil formation showing an apparatus according to an embodiment.
Figure 2:
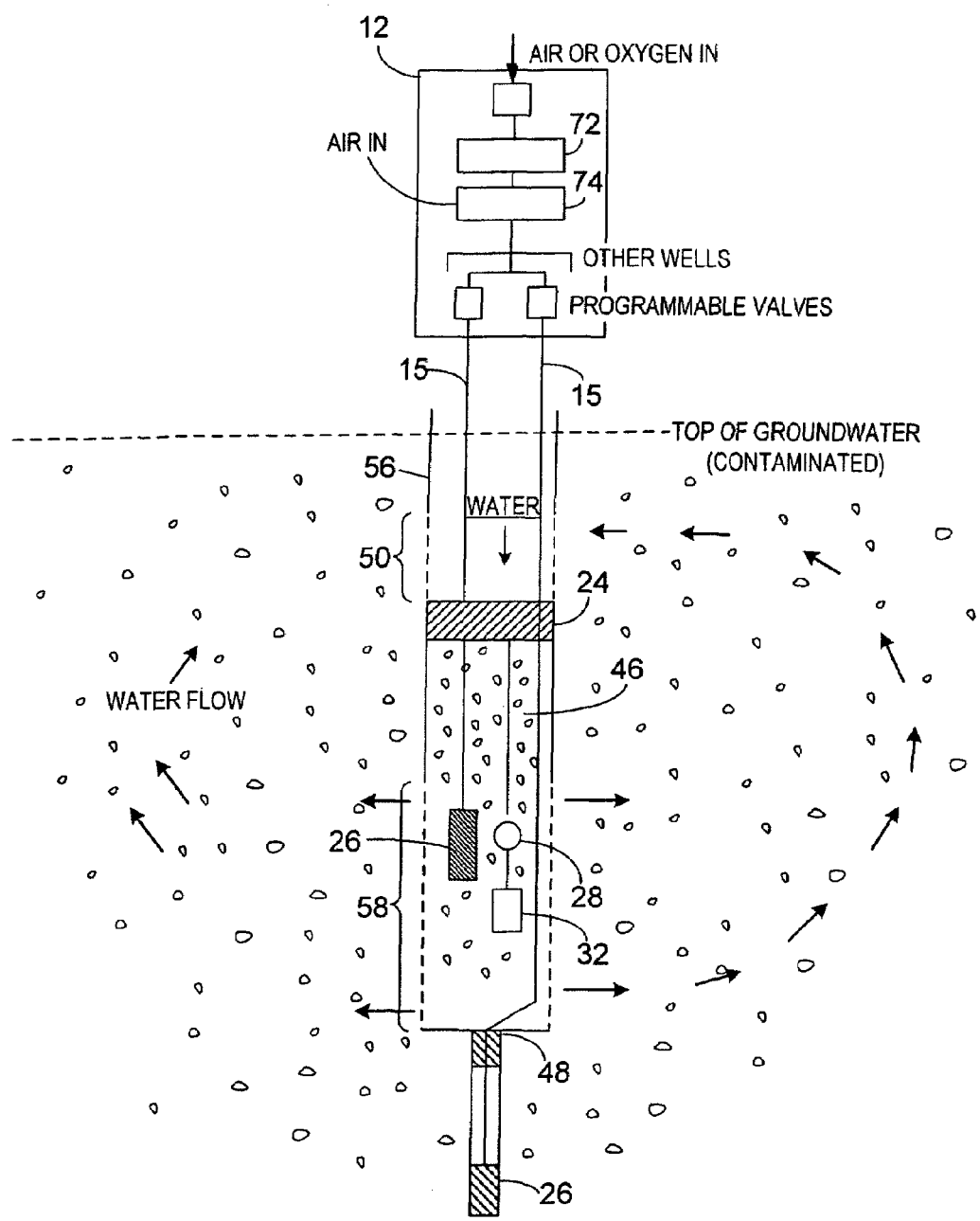
FIG. 2 is an enlarged piping schematic of the apparatus of FIG. 1 showing the unique fine bubble production chamber.
Figure 3:
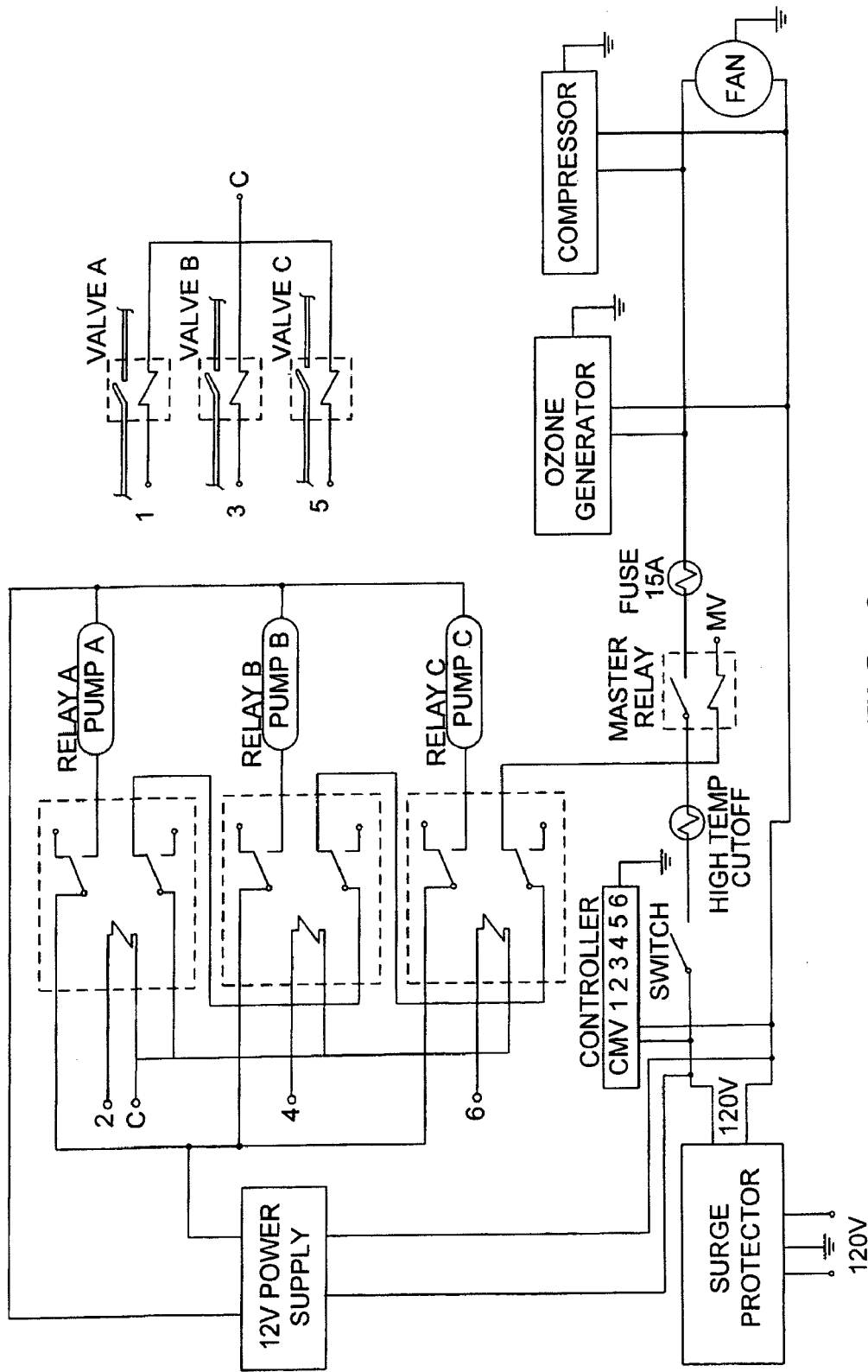
FIG. 3 is an electrical schematic for a three well system (Model 3503 or 3603) of the apparatus of FIG. 1.

In an embodiment, as shown in FIG. 1 and FIG. 2, master unit (12) consists of the following: a gas generator (16), a gas feed line (15), a compressor (18), a power source (19), a pump control unit (20), and a timer (2). Master unit (12) must be firmly mounted on 4×4 posts (40) or a building wall (42) near in-well sparging units (14). A heavy-duty power cable (44), not over 50 feet in length, may be used to run from the power source to master unit (12).

Referring to FIGS. 1 and 2, in-well sparging unit (14) consists of a casing (56), an inlet screen (50), an expandable packer (52), an upper site grout (54), an outlet screen (58), and lower grout (62). Each in-well unit (14) includes a fixed packer (24), at least two microporous diffusers (26), a water pump (28), ozone line (30), check valve (32), and fittings (34). As shown in FIGS. 1 and 2, diffuser (26) employs a microporous diffuser in place of a standard slotted well screen to improve dispersion of bubbles (60) through soil shown at (84) and to improve rate of gaseous exchange. A normal 10-slot PVC well screen contains roughly twelve percent (12%) open area. Under pressure most air exits the top slits and radiates outward in a star-like fracture pattern, evidencing fracturing of the formation.

Figure 4:
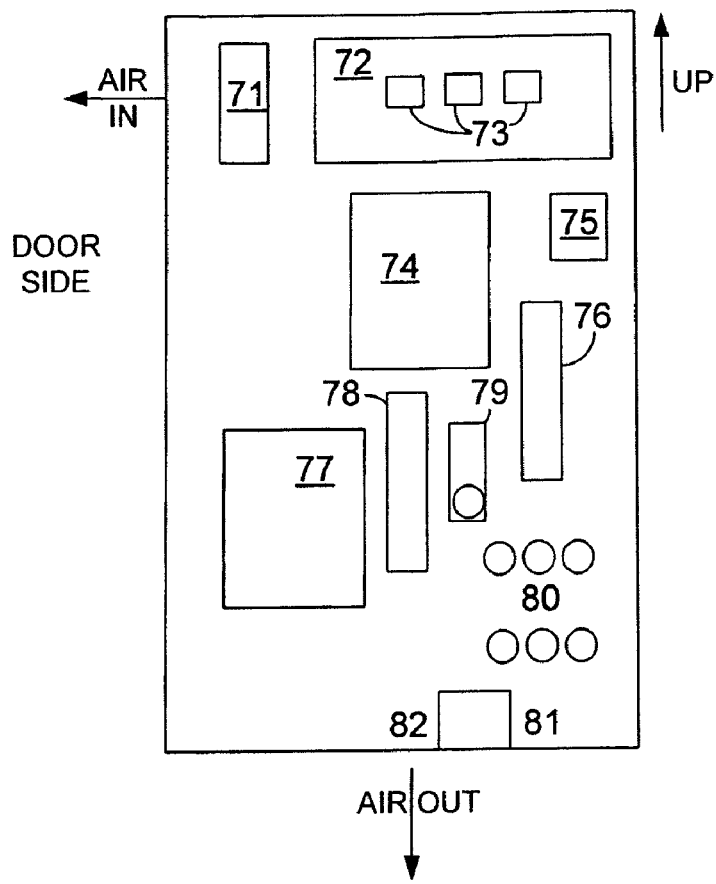
FIG. 4 shows an internal layout of a control module box for a three well system (M-3503 or M-3603) of FIG. 1.
Figure 5A:
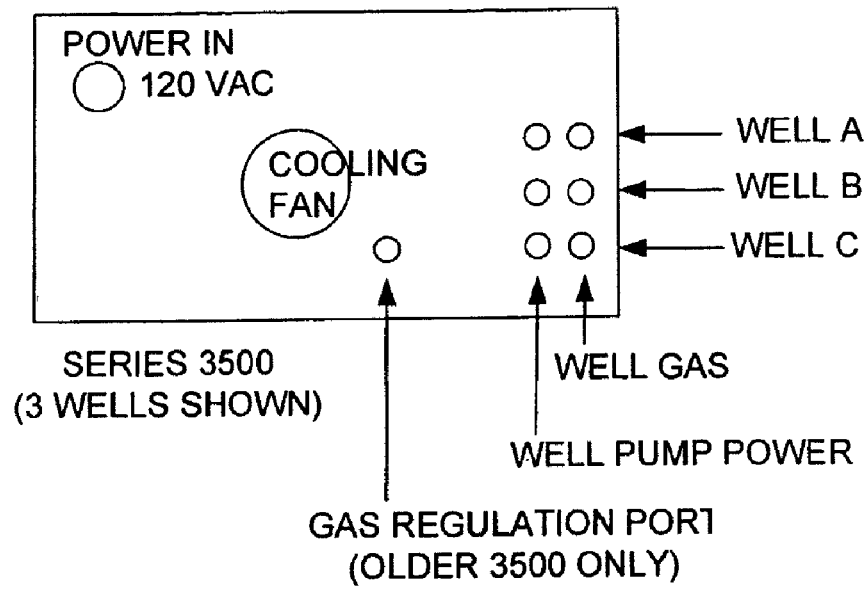
FIG. 5A shows the geometry of a bottom panel on the control module identifying external connections and ports for three well units (M-3503 & 3603) of the apparatus of FIG. 1.
Figure 5B:
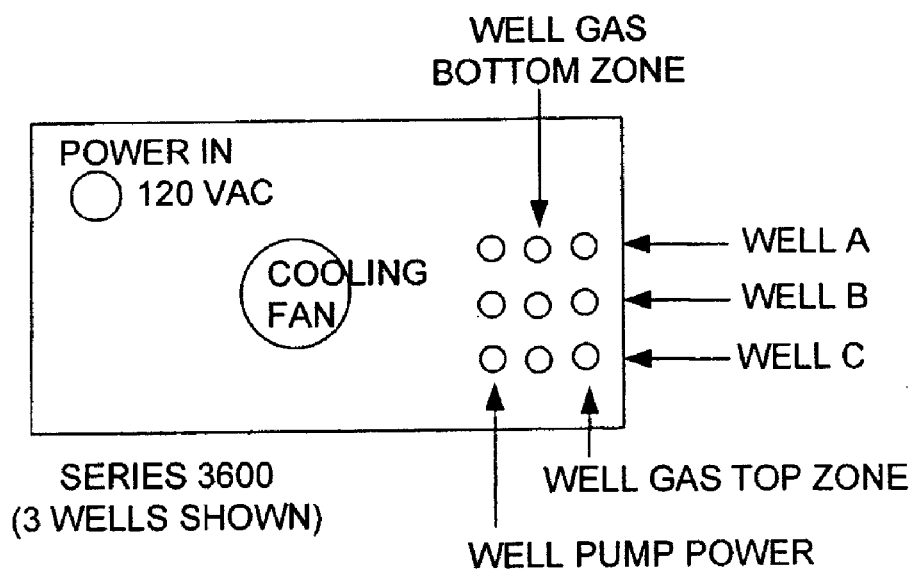
FIG. 5B is a left side view of FIG. 5A.
Figure 6:
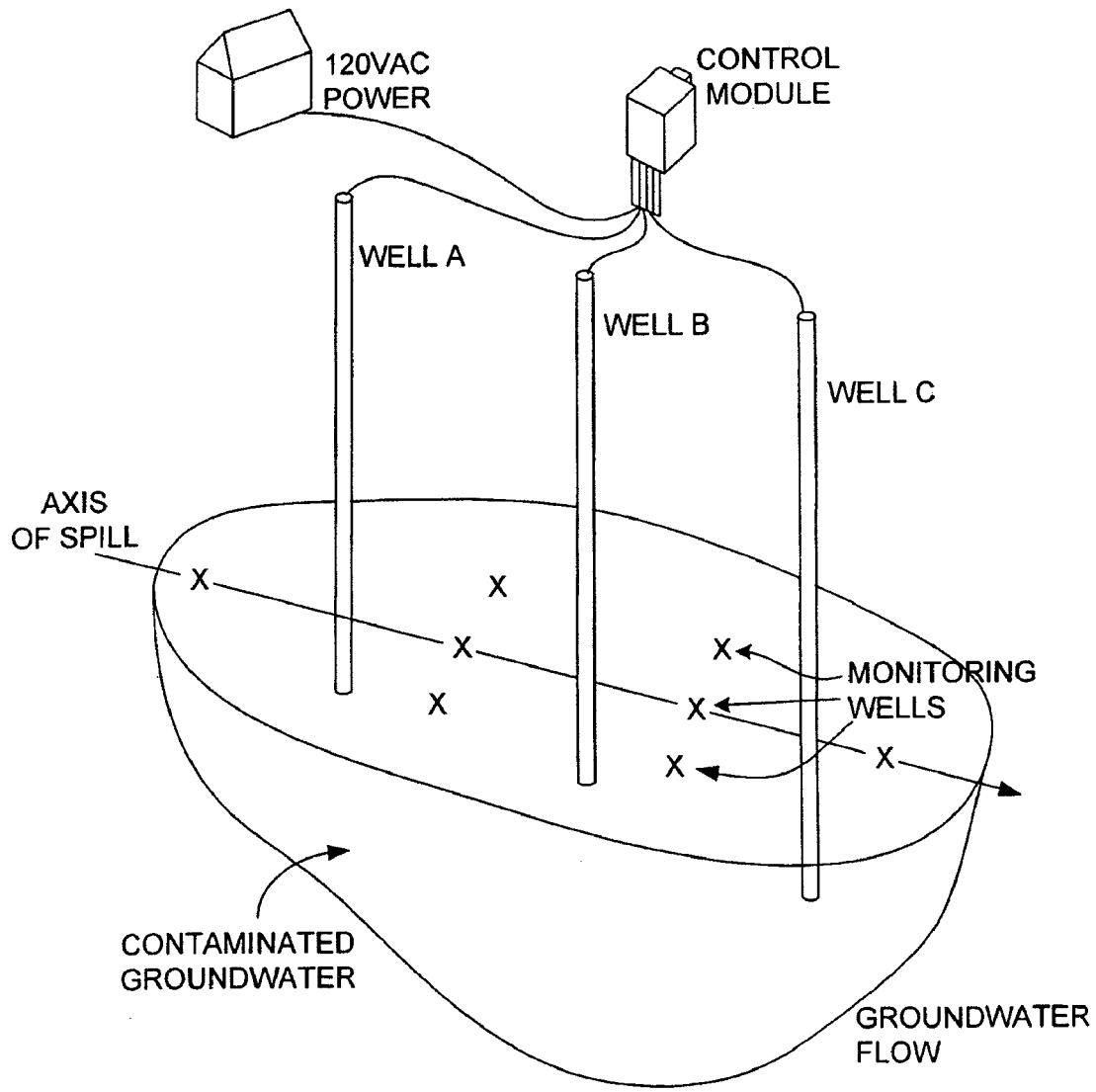
FIG. 6 is a schematic illustration of a soil formation showing the apparatus of FIG. 1.
Figure 7:
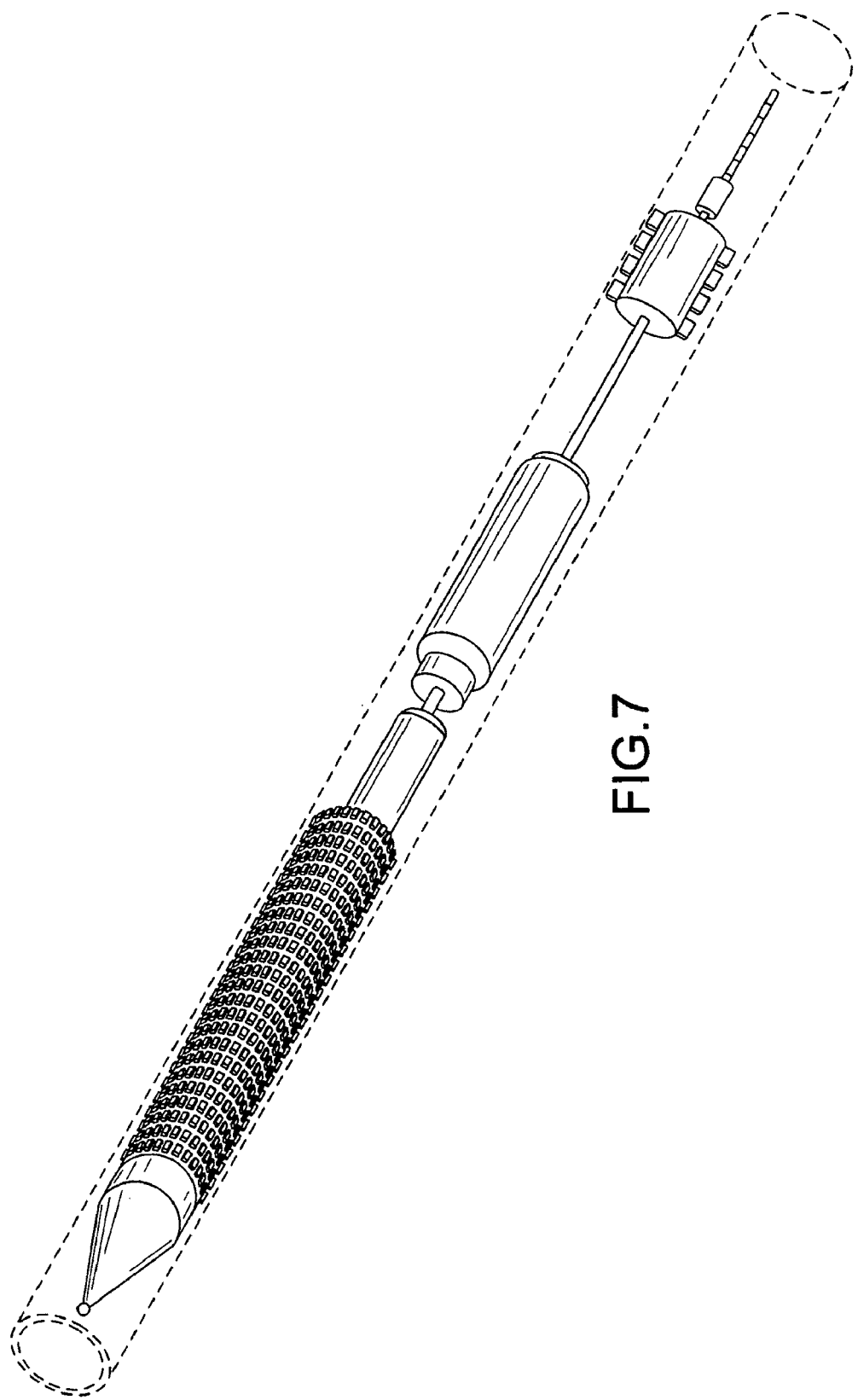
FIG. 7 is a perspective view of a bubbler sparge unit for groundwater treatment shown partly in section.
Figure 8:
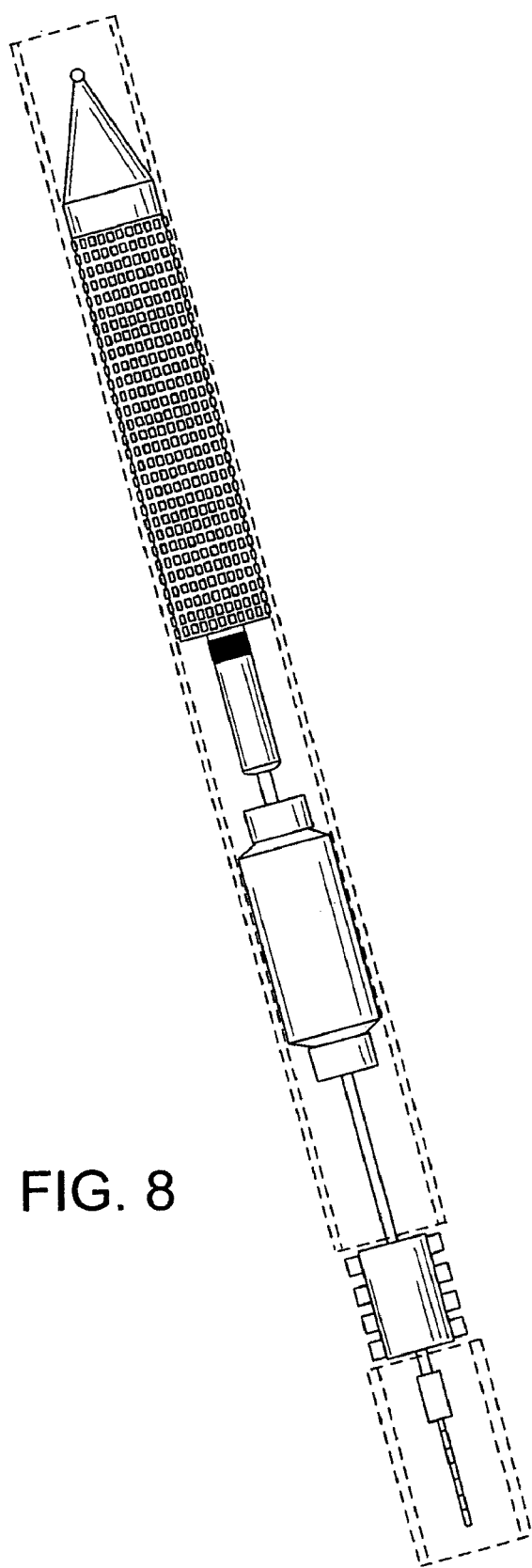
FIG. 8 is a front view of the bubbler sparge unit of FIG. 7.
Figure 9:
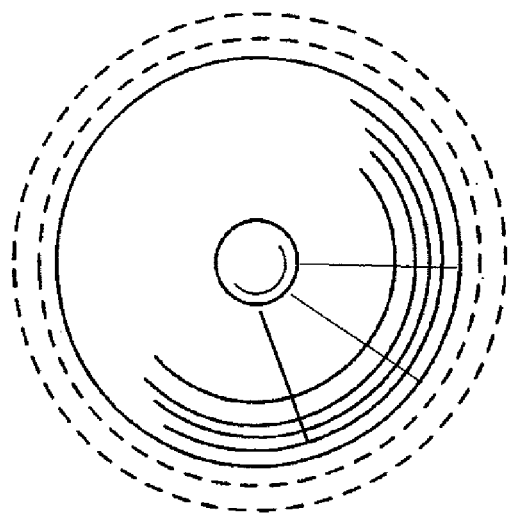
FIG. 9 is a top elevational view of the bubbler sparge unit of FIG. 7.
Figure 10:
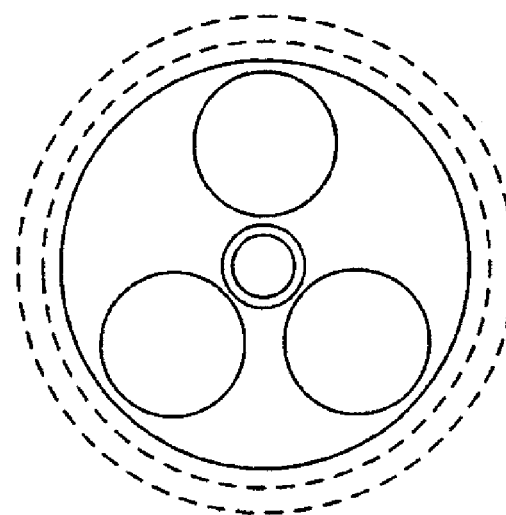
FIG. 10 is a bottom elevational view of the bubbler sparge unit of FIG. 7.
Figure 11:
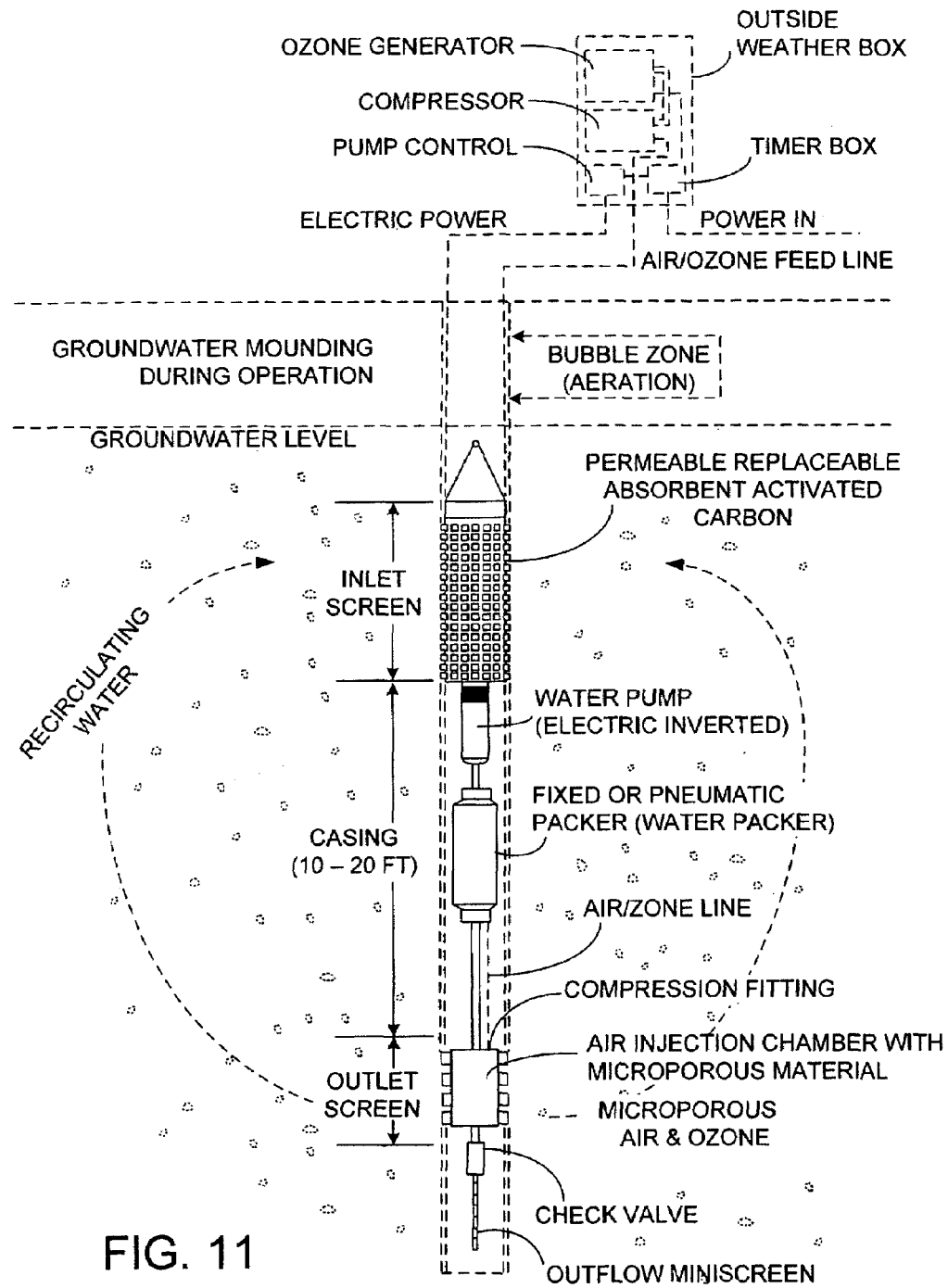
FIG. 11 is a front elevational view of the bubbler sparge unit of FIG. 7; the broken line shows the bubbler sparge unit in situ for groundwater treatment.

Referring to FIG. 2 there is shown a fine bubble production chamber (46) positioned in the well casing (56) between the upper well screen (50) positioned immediately below fixed packer (24) consisting of a removable closure plug and the lower plug (48) consisting of the fine bubble production chamber (46) containing bubbles (60) including upper Spargepoint® (26) positioned above lower well screen (58) including pump (28) and check valve (32). Referring to FIG. 4 there is shown the internal layout of the control module box

(12) including an AC/DC power converter (71), and ozone generator (72), well gas relays (73) (three wells shown), a compressor (74), a master relay (75), a main fuse (76). There is also shown a programmable timer controller (77), a power strip (78), a gas regulator and pressure gauge (79), together with a solenoid manifold (80), a ground fault interrupter (81) and a cooling fan (82).

Spargepoint® diffusers include several unique configurations as follows:

a. A direct substitute for a well screen comprising 30% porosity, 5-50 micron channel size and resistance to flow from 1 to 3 PSI. This configuration can take high volume flow and needs a selective annular pack (sized to formation). The use of high density polyethylene or polypropylene is light-weight, rugged and inexpensive.

b. A microporous diffuser can be placed on the end of a narrow diameter pipe riser KVA 14-291. This reduces the residence time in the riser volume.

c. A shielded microporous diffuser which is injected with a hand-held or hydraulic vibratory hammer. The microporous material is molded around an internal metal (copper) perforated tubing and attached to an anchor which pulls the Spargepoint® out when the protective insertion shaft is retracted. The unit is connected to the surface with 3/16 or 1/4 inch polypropylene tubing with a compression fitting.

d. A thin Spargepoint® with molded tubing can be inserted down a narrow shaft for use with push or vibratory tools with detachable points. The shaft is pushed to the depth desired, then the Spargepoint® is inserted, the shaft is pulled upwards, pulling off the detachable drive point and exposing the Spargepoint®.

e. A microporous diffuser/pump combination placed within a well screen in such a manner that bubble production and pumping is sequenced with a delay to allow separation of large bubbles from the desired fine "champagne" bubbles. The pressure from the pump is allowed to offset the formation back pressure to allow injection of the remaining fine bubbles into the formation.

Improvements

In the present apparatuses an improvement comprises several new equipment designs associated with the Spargepoint® diffusers. Most important is the submittal for HDPE porous material with well fittings and pass-through design which allows individual pressure and flow control as shown in FIGS. 7-11.

Secondly, the push-probe points have been developed for use with pneumatic tools, instead of drilling auger insertion.

Improvements on C-Sparger®/microporous Spargepoint® diffuser. One of the major pass-through Spargepoint® problems in horizontal sparging is the even distribution of air bubbles. If an inlet is attached to the end of a screen, the pressure drops continuously as air is released from the screen. The resulting distribution of flow causes most bubbles to be produced where the connection occurs with flow alternating outwards. The end of the screen produces little or no bubbles.

Figure 12:
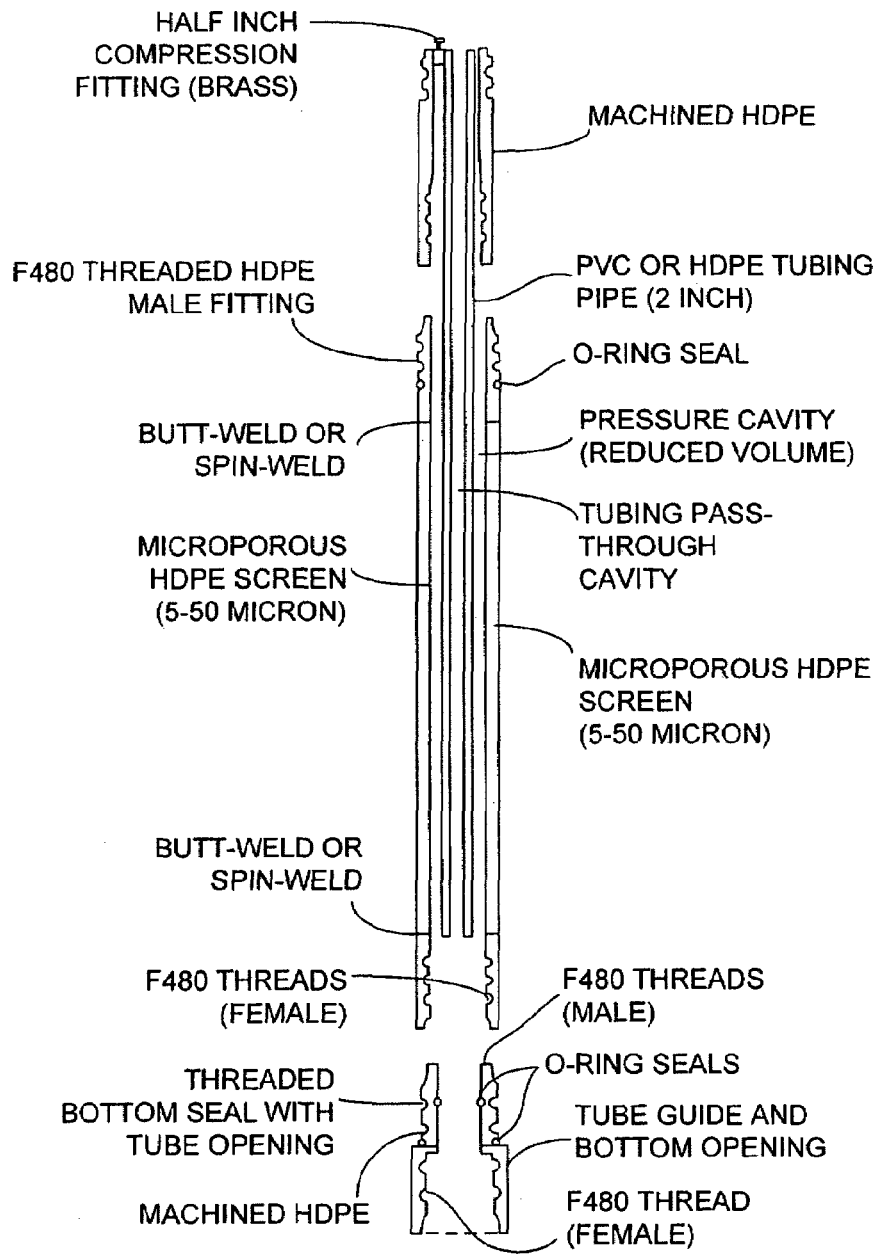
FIG. 12 is an alternate embodiment of a microporous Spargepoint® assembly of the apparatus of FIG. 1.
Figure 13:
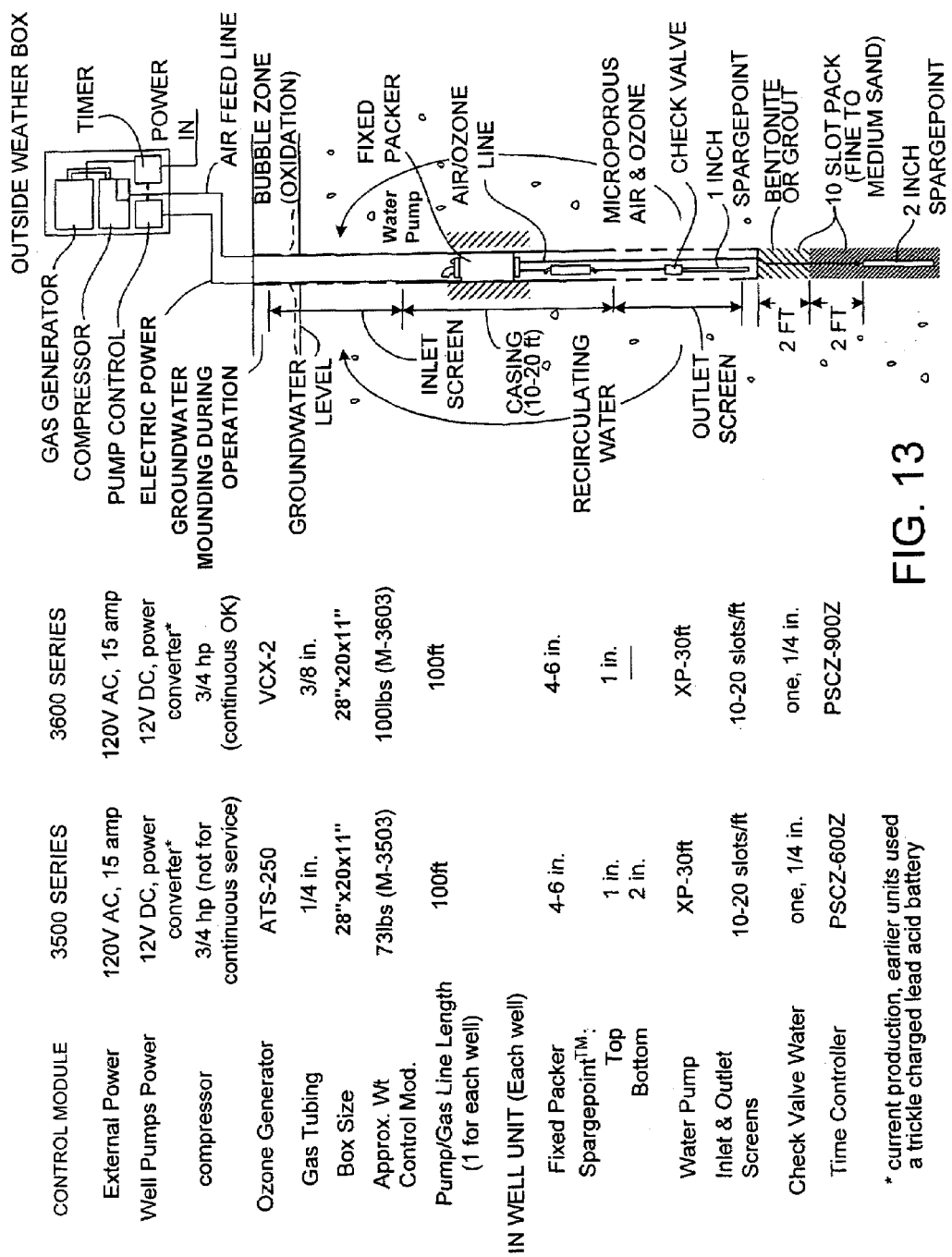
FIG. 13 describes Series 3500 & 3600 systems.

To allow even distribution of bubbles, either individual Spargepoints® are bundled (spaghetti tube approach) or the Spargepoints® are constructed in a unique way which allows interval tubing connections with flow and pressure control for each Spargepoint® region within the proposed arrangement. Tubing connected to a Spargepoint® passes through the Spargepoint® internally without interfering with the function of producing small bubbles on a smooth external surface. The tubing penetration reduces the internal gas volume of the Spargepoint®, thereby reducing residence time for oxidative gases (important since ozone has a certain half-life before decomposition), and allows three to four Spargepoints® to be operated simultaneously with equal flow and pressure. Each Spargepoint® can also be programmed to pulse on a timed sequencer, saving electrical costs and allowing certain unique vertical and horizontal bubble patterns. Spargepoint® diffusers can be fitted with an F480 thread with internal bypass and compression fittings, FIG. 12. Some advantages are as follows:

(1) fits standard well screen;
(2) allows individual flow/pressure control;
(3) reduces residence time; and
(4) allows for casing/sparge instead of continuous bubbler.

Use of injectable points configured as molded, 18 Inch×40 inch HDPE molded into 1/4 inch pp tubing or HDPE tubing allows a smooth tube to be inserted into a push probe with a detachable point. Use of "Bullet" prepacked Spargepoint® diffusers with a KVA "hefty system" prepacked sand cylinder and bentonite cylinder placed over tubing and porous point is advantageous. Also use of a porous point reinforced with inner metal tube (perforated) to allow strength throughout tubing resists disintegration of plastic during insertion.

Use of pressure/flow headers: Rotameter/mirror: A mirror placed at an angle in a well hole to allow site of a flowmeter reading scale to a point.

It is well recognized that the effectiveness of treatment is dependent upon the uniformity of gas dispersion as it travels through the formation. A porous structure, with appropriate packing, matches the condition of the pores of the soil with thirty percent (30%) pore distribution. The dispersion of bubbles as a fluid can be checked using Darcy's equation.

The use of microporous materials in the Spargepoint® to inject gases into groundwater saturated formations has special advantages for the following reasons:

1. Matching permeability and channel size;
2. Matching porosity;
3. Enhancing fluidity, which can be determined in situ.

The most effective range of pore space for the diffuser material selected depends upon the nature of the unconsolidated formation to be injected. The following serves as a general guide:

1. Porosity of porous material: thirty percent (30%);
2. Pore space: 5-200 microns;
    a. 5-20 very fine silty sand;
    b. 20-50 medium sand;
    c. 50-200 coarse sand and gravel.

The surrounding sand pack placed between the Spargepoint® and natural material to fill the zone after drilling and excavation should also be compatible in channel size to reduce coalescing of the produced bubbles.

The permeability range for fluid injection function without fracturing would follow:

1. $10^{-2}$ to $10^{-6}$ cm/sec, corresponding to 2 to 2000 Darcy's; or
2. $10^{-2}$ to $10^{-6}$ cm/sec; or
3. 100 to 0.01 ft/day hydraulic conductivity.

Permeability is defined as a measure of the ease of movement of a gas through the soil. The ability of a porous soil to pass any fluid, including gas, depends upon its internal resistance to flow, dictated largely by the forces of attraction, adhesion, cohesion, and viscosity. Because the ratio of surface area to porosity increases as particle size decreases, permeability is often related to particle size see Table 3.

What is claimed is:

1. An apparatus for removal of volatile organic compounds in a soil formation comprising:
   a diffuser for injecting air and gaseous ozone as bubbles into water in the soil formation, the gaseous ozone at concentrations to effect removal of volatile organic compounds by the gaseous ozone reacting with the volatile organic compounds,
   wherein injection of air and gaseous ozone is controlled by a timer to allow separation of bubbles by size,
   wherein the bubbles range in size from about 5 to 200 μm.

2. The apparatus of claim 1 wherein the air and gaseous ozone are mixed and injected into the water as bubbles with an initial bubble size in a range of about 5 to 200 μm.

3. The apparatus of claim 1 wherein the timer periodically pulses the injected air and gaseous ozone.

4. The apparatus of claim 1 further comprising a bubble sizing chamber.

5. The apparatus of claim 1 further comprising a pump for agitating water to disperse the bubbles through the soil formation.

6. The apparatus of claim 1 wherein the diffuser has a pore size selected to match a porosity of a surrounding soil formation.

7. The apparatus of claim 1 further comprising:
   a casing;
   a packer disposed through the casing; and
   an outlet screen coupled to the casing.

8. The apparatus of claim 7 wherein the outlet screen is coupled to the casing at a lower portion of the casing and the apparatus further comprises an inlet screen coupled to the casing at an upper portion of the casing.

9. An apparatus for removal of volatile organic compounds in a soil formation comprising:
   a plurality of diffusers for injecting air and gaseous ozone as bubbles into water in the soil formation, the gaseous ozone at concentrations to effect removal of volatile organic compounds by the gaseous ozone reacting with the volatile organic compounds,
   wherein injection of air and gaseous ozone is controlled by at least one timer to allow separation of bubbles by size,
   wherein the bubbles range in size from about S to 200 μm.

10. The apparatus of claim 9 wherein the plurality of diffusers is arranged in series.

11. The apparatus of claim 9 wherein the plurality of diffusers is controlled by a single timer.

12. The apparatus of claim 9 wherein each diffuser is coupled to one of a plurality of timers.

13. The apparatus of claim 9 wherein the air and gaseous ozone are mixed and injected into the water as bubbles with an initial bubble size in a range of about 5 to 200 μm.

14. The apparatus of claim 9 wherein the timer periodically pulses the injected air and gaseous ozone.

15. The apparatus of claim 9 further comprising a bubble sizing chamber.

16. The apparatus of claim 9 further comprising a pump for agitating water to disperse the bubbles through the soil formation.

17. The apparatus of claim 9 wherein microporous material of the diffusers has a pore size selected to match a porosity of a surrounding soil formation.

18. The apparatus of claim 9 further comprising:
   a casing;
   a packer disposed through the casing; and
   an outlet screen coupled to the casing.

19. The apparatus of claim 18 wherein the outlet screen is coupled to the casing at a lower portion of the casing and the apparatus further comprises an inlet screen coupled to the casing at an upper portion of the casing.

20. The apparatus of claim 18 wherein the packer is disposed through the casing between the inlet and outlet screens.

* * * * *